Patented Aug. 9, 1949

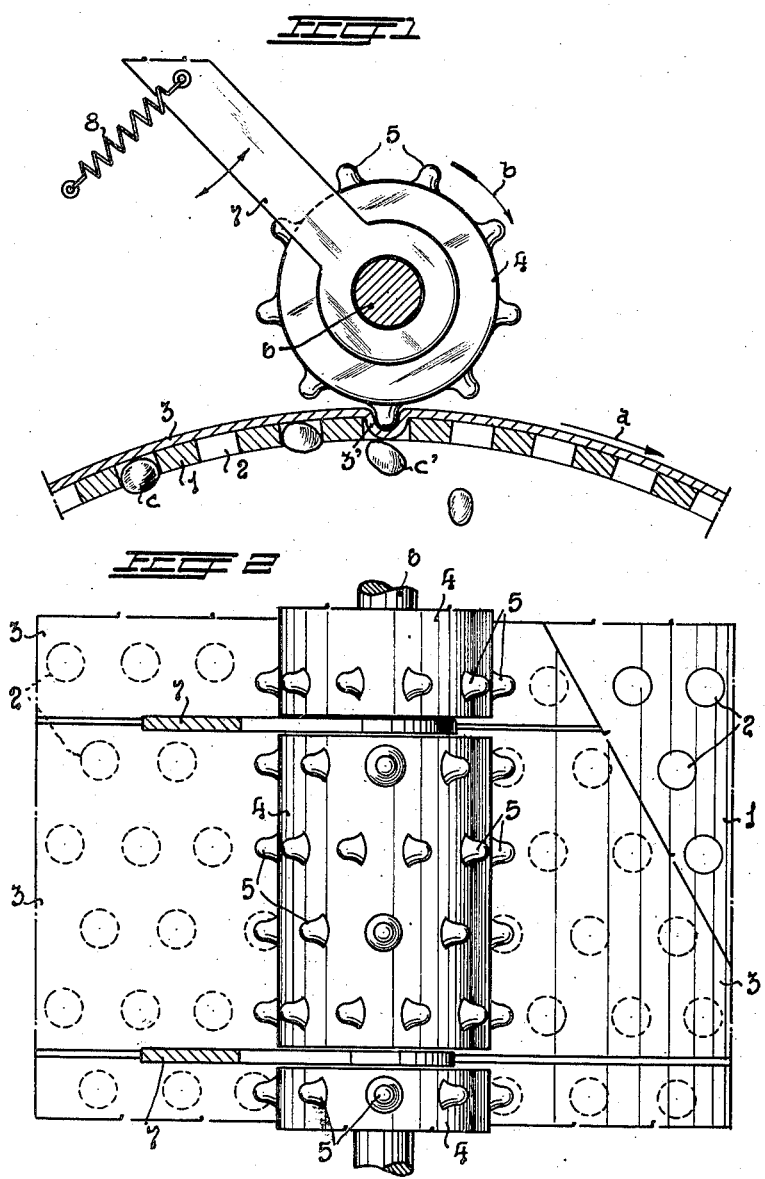

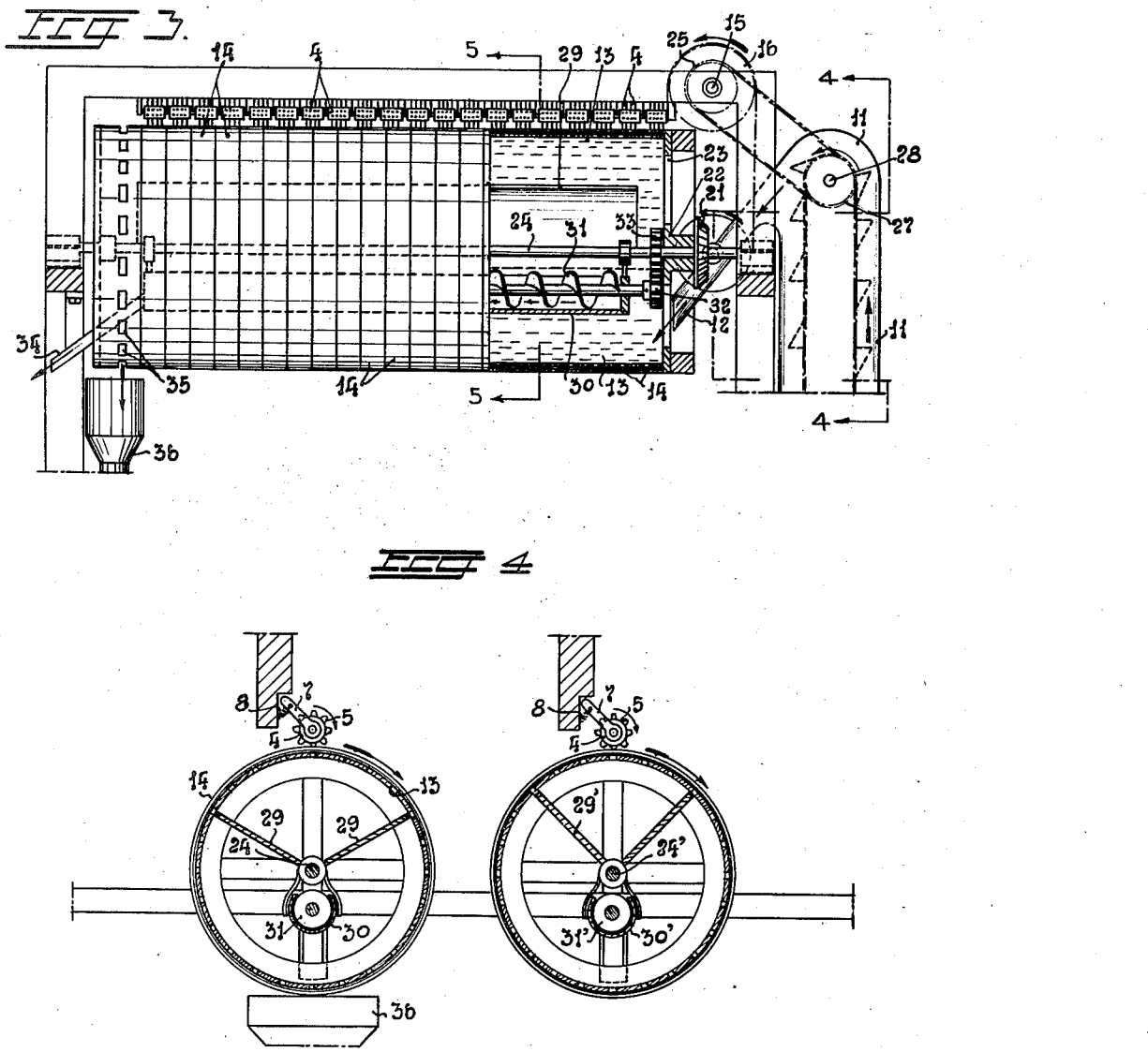

2,478,246

UNITED STATES PATENT OFFICE 2,478,246

CLEARER FOR INTERNALLY POCKETED ASSORTING CYLINDER

Elda E. Cortese and Ricardo Ramirez,
Buenos Aires, Argentina

Application August 29, 1945, Serial No. 613,386

3 Claims. (Cl. 209—95)

This invention refers to an apparatus for classifying grains of any kind, and particularly for mechanically separating the cuscuta seeds from alfalfa seeds. The operation of the apparatus is based on the particular arrangement of the cavities with which the classifying discs or cylinders are provided.

The particular feature of the said classifying cavities is the fact that they are cylindrically bored in a metallic sheet, the holes passing from one face to the other of the sheet material, and having a diameter which substantially corresponds to that of the seeds to be separated; and also by the additional fact that the sheet carries, secured thereto, against its rear surface, an elastic surface, of rubber or the like which may be forced into the cavities. A roller is provided having small protuberances or teeth to press the elastic sheet into the cavities for expelling therefrom the seeds that may have lodged therein.

The provision of the elastic bottom together with the roller eliminates all stoppages because of clogging of the cavities or holes in the cylinder.

In order that the invention may be clearly understood and readily carried into effect, it has been illustrated in one of its preferred arrangements in the accompanying drawings, and a full description thereof will be given in the following paragraphs, with reference to the drawings, in which:

Figure 1 shows, schematically, a piece of perforated sheet or plate provided with the corresponding elastic bottom and the roller provided with protuberances or teeth that press over and introduce the elastic bottom inside the cavities.

Figure 2 is a plan view of Figure 1 with part of the elastic surface broken away.

Figure 3 is a longitudinal section of the classifying apparatus.

Figure 4 is a cross-section on the line 4—4 of Figure 3.

Referring to the schematic Figures 1 and 2, the numeral 1 indicates a rotatably mounted metallic sheet cylinder provided with series of cylindrical holes 2 which are covered, at their backs, with an elastic plate 3 serving as a bottom for the respective cavities. A roller rotatably mounted on shaft 6 carried by arms 7, having a plurality of protuberances or teeth 5 disposed thereon for alignment with cylindrical holes 2, is urged against said elastic surface under the action of spring 8 connected at one end to arms 7 and at the other end to a stationary frame. The roller 4 rotates with cylinder 1 because of being in frictional engagement therewith and also because of teeth 5 engaging the sides of cavities or holes 2.

Alignment of teeth 5 with holes 2 is facilitated at the same time by the fact that the protuberances or teeth, meet less resistance at the points corresponding to the perforations 2 and have a tendency to position themselves.

In the schematic Figure 1 of the drawings, can be seen, very clearly, the basic idea of this invention. The sheet cylinder turns as indicated by the arrow $a$ and causes the rotation of the roller as shown by the arrow $b$. The grains $c$ that have been picked up by the cavities are carried by the latter until they reach a position below the roller 4, where protuberances or teeth 5 press against the elastic bottom 3 and force it into the cavity, as shown in 3', thus expelling the grain or seed $c'$ that was inside the cavity. These grains or seeds are those that are separated from the bulk of the grains, and when they fall, are prevented from being mixed up again with the other grains.

In Figures 3 and 4 inclusive has been shown, as an example, a machine that works according to the above fundamental principle, but as it will be clearly understood, such example is not limitative. For sake of brevity, this machine will be described following the travel of the grains or seeds within the classifier.

The apparatus carries two classifying cylinders 13, similar in operation, and is provided with a loading hopper 9 for storing the grains; the grains pass through a duct 10 and are taken by a conveyor 11 which raises it, and drops it, inside a duct 12 that leads to the interior of the classifying cylinder 13, made of metallic sheet such as that designated with the numeral 1 in Figure 1, and which is provided with holes 2.

The said cylinder has an external elastic covering such as that indicated with 3 in Figure 1 and which, in the present arrangement, is a series of elastic rings 14 placed side by side, which rings may be made of rubber, elastic texture or thick common cloth having lengths of rubber therein or, finally, of some elastic material which at the same time will keep pressed against the plate of the classifying cylinder.

At the upper part of the cylinder, there are provided a series of rollers 4 (see Figures 3 and 5), provided with their protuberances 5 and being mounted on corresponding oscillating arms 7.

The rotation of cylinder 13 is caused by a shaft 15 through a pulley 16, belt 17 and pulley 18 fixed on shaft 19, the latter carrying a bevel pinion 20 that meshes with a second similar pinion 21, fixed on hub 22 that supports the radial arms 23 of cylinder 13. The said hub jointly with pinion 21, rotate freely on a fixed shaft 24 secured at its ends to the frame of the machine.

Similarly, the motion of conveyor 11 is derived from shaft 15 by means of a pulley 25, belt 26 and pulley 27 secured to shaft 28 of the conveyor.

The grains or seeds that arrive through duct 12 occupy the lower part of the cylinder, and the grains or seeds that correspond in size to the size of the cavities enter and remain therein, and are carried over. The carried over grains on reaching the top of the cylinder, are expelled by the action of the rollers whose protuberances press the elastic bottom, and are dropped over tilted plates 29 that lead such grains to a channel 30, in the interior of which revolves an helical conveyor 31 that is rotated at the end of its shaft by a pinion 32 that meshes with another pinion 33 integral with the hub 22 of the cylinder.

The grains or seeds that are carried by the helical conveyor 31, are those that must be separated from the rest, and for that purpose the conveyor leads to a channel 34 where they are collected.

The remaining grains or seeds continue to move along the bottom of cylinder 13 (for which purpose it is placed slightly inclined) and emerge through the openings 35 provided on the periphery of the cylinder, at the end opposite to that through which they entered, being finally discharged through duct 36 that carries them to the lower portion of another conveyor 37, which raises them and discharges them into another classifying cylinder 13', built as the former, with the sole exception that the holes of the cavities are slightly larger.

The passage of the grains or seeds through the latter cylinder is effected in order to increase the efficiency of the classifying operation, by withdrawing from the bulk of grains any grains or seeds that may have scaped the first classifying operation.

The process that takes place in this second cylinder is similar to that of the former, the motion of the cylinder being obtained, as may be seen in Figure 4, from the same shaft 19 that carries bevel pinion 20' in mesh with pinion 21' fixed to cylinder 13'. The motion of conveyor 37 is received from shaft 15, pulley 38, belt 39, pulley 40 to shaft 41 of the conveyor. In this second cylinder, the remaining parts have been designated with the same numerals as in the first cylinder, with the addition of (').

As it has already been said, the construction of this apparatus may be changed in various ways without thereby departing from the scope of the present invention, which is clearly set forth in the appended claims.

What we claim is:

1. Apparatus for classifying grains, comprising a rotatably mounted cylinder having a plurality of holes formed therein, an elastic covering coextensive with and on the outer surface of said cylinder and closing the outer ends of said holes, a rotatably mounted roller disposed for frictional engagement with the elastic covering on said cylinder, a plurality of teeth on said roller aligned to mesh with said holes whereby said elastic covering is urged into said holes, conveyor means in said cylinder to carry off segregated grain, and a duct connected to said cylinder to supply grain thereto.

2. Apparatus for classifying grains, comprising a rotatably mounted cylinder having a plurality of holes formed therein, an elastic covering coextensive with and on the outer surface of said cylinder and closing the outer ends of said holes, a rotatably mounted roller disposed for frictional engagement with the elastic covering on said cylinder, a plurality of teeth on said roller aligned to mesh with said holes whereby said elastic covering is urged into said holes, a channel in said cylinder and extending longitudinally therethrough, a helical conveyor rotatably mounted and in said channel for carrying off grain carried over by said cylinder, a loading hopper, and a conveyor connected to said hopper and to the other end of said cylinder for feeding grain to be classified thereto.

3. Apparatus for classifying grains, comprising a rotatably mounted cylinder having a plurality of holes formed therein, an elastic covering coextensive with and on the outer surface of said cylinder and closing the outer ends of said holes, a rotatably mounted roller disposed for frictional engagement with the elastic covering on said cylinder, a plurality of teeth on said roller aligned to mesh with said holes whereby said elastic covering is urged into said holes, a rotatably mounted hub, radial arms connecting said hub to said cylinder, a channel in said cylinder and extending longitudinally therethrough, a helical conveyor rotatably mounted and in said channel for carrying off grain carried over by said cylinder, means connected to said hub and to a source of power supply for rotating said hub, means connected to said hub and to said helical conveyor for rotating the same, a loading hopper, and a conveyor connected to said hopper and to the other end of said cylinder for feeding grain to be classified thereto.

ELDA E. CORTESE.
R. RAMIREZ.

REFERENCES CITED

The following references are of record in the file of this patent:

UNITED STATES PATENTS

| Number | Name | Date |
| --- | --- | --- |
| 118,094 | Balch | Aug. 15, 1871 |
| 188,641 | Kurth | Mar. 20, 1877 |
| 258,297 | Herse | May 23, 1882 |
| 580,496 | Kruger | Apr. 13, 1897 |
| 658,843 | Heid | Oct. 2, 1900 |
| 1,460,463 | Williams | July 3, 1923 |
| 2,047,508 | Ingraham | July 14, 1936 |
| 2,316,986 | Parker | Apr. 20, 1943 |

FOREIGN PATENTS

| Number | Country | Date |
| --- | --- | --- |
| 2,904 | Great Britain | Mar. 3, 1885 |